United States Patent
Kwak et al.

(10) Patent No.: US 11,285,871 B2
(45) Date of Patent: Mar. 29, 2022

(54) METHOD AND SYSTEM OF CONTROLLING INTERIOR SOUND OF VEHICLE

(71) Applicants: HYUNDAI MOTOR COMPANY, Seoul (KR); KIA MOTORS CORPORATION, Seoul (KR)

(72) Inventors: Seong Youn Kwak, Hwaseong-si (KR); Jae Hyun Park, Suwon-si (KR); Dong Wook Lee, Hwaseong-si (KR); Sang Il Lee, Seongnam-si (KR); Won Seop Choi, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 91 days.

(21) Appl. No.: 16/815,736

(22) Filed: Mar. 11, 2020

(65) Prior Publication Data

US 2021/0114519 A1 Apr. 22, 2021

(30) Foreign Application Priority Data

Oct. 17, 2019 (KR) .................. 10-2019-0129424

(51) Int. Cl.
  *B60Q 9/00* (2006.01)
(52) U.S. Cl.
  CPC .................... *B60Q 9/00* (2013.01)
(58) Field of Classification Search
  None
  See application file for complete search history.

(56) References Cited

U.S. PATENT DOCUMENTS

| | | | | |
|---|---|---|---|---|
| 5,371,802 A | * | 12/1994 | McDonald | G10K 15/02 381/110 |
| 5,635,903 A | * | 6/1997 | Koike | A63H 17/34 340/384.1 |
| 7,020,288 B1 | * | 3/2006 | Ohashi | G10K 11/17823 381/71.4 |
| 7,062,049 B1 | * | 6/2006 | Inoue | G10K 11/17854 381/71.4 |
| 7,088,829 B1 | * | 8/2006 | Schick | B60Q 5/00 381/61 |
| 8,155,343 B2 | * | 4/2012 | Honji | G10K 15/04 381/86 |
| 8,942,836 B2 | * | 1/2015 | Inoue | G10K 15/02 700/94 |
| 9,218,801 B2 | * | 12/2015 | Reilly | G10K 11/175 |
| 9,682,652 B2 | * | 6/2017 | Bailey, III | F16H 63/40 |
| 9,693,139 B1 | * | 6/2017 | Teknos | G06F 3/165 |
| 9,860,667 B2 | * | 1/2018 | Barlow, Jr | B60Q 5/00 |

(Continued)

FOREIGN PATENT DOCUMENTS

KR 10-2018-0031668 A 3/2018

*Primary Examiner* — Muhammad Adnan
(74) *Attorney, Agent, or Firm* — Lempia Summerfield Katz LLC

(57) ABSTRACT

A system for controlling an interior sound of a vehicle phase-changes the frequency of additional sound based on the engine operating state to increase the current density, thereby inhibiting signal distortion by increasing the current density. As a result, the distortion phenomenon caused by excessive use of amplifier current when generating the additional sound is reduced or minimized, and unnecessary noise is inhibited from occurring in a vibration generator and a frame of the vehicle.

6 Claims, 7 Drawing Sheets

(56) References Cited

U.S. PATENT DOCUMENTS

| | | | |
|---|---|---|---|
| 10,011,224 B2* | 7/2018 | Chang | B60Q 9/00 |
| 10,425,722 B2* | 9/2019 | Toda | G10K 11/18 |
| 10,583,788 B2* | 3/2020 | Toda | B60R 11/0217 |
| 10,608,596 B1* | 3/2020 | Pires | H03F 1/3264 |
| 10,930,260 B2* | 2/2021 | Christoph | G10K 11/17823 |
| 2004/0125967 A1* | 7/2004 | Eid | H04S 7/302 |
| | | | 381/99 |
| 2004/0240678 A1* | 12/2004 | Nakamura | G10K 11/17854 |
| | | | 381/71.11 |
| 2004/0247137 A1* | 12/2004 | Inoue | G10K 11/17823 |
| | | | 381/71.4 |
| 2006/0215846 A1* | 9/2006 | Kobayashi | G10K 15/02 |
| | | | 381/61 |
| 2007/0025559 A1* | 2/2007 | Mihelich | H04S 7/307 |
| | | | 381/59 |
| 2007/0230716 A1* | 10/2007 | Kobayashi | G10K 15/02 |
| | | | 381/86 |
| 2007/0234879 A1* | 10/2007 | Kobayashi | G10H 1/14 |
| | | | 84/600 |
| 2009/0028353 A1* | 1/2009 | Kobayashi | A63G 31/16 |
| | | | 381/61 |
| 2015/0364125 A1* | 12/2015 | Park | B60Q 5/008 |
| | | | 701/36 |
| 2016/0284334 A1* | 9/2016 | Hera | G10K 15/02 |
| 2017/0330549 A1* | 11/2017 | Terashima | H04R 1/1083 |

* cited by examiner

METHOD AND SYSTEM OF CONTROLLING INTERIOR SOUND OF VEHICLE

CROSS REFERENCE TO RELATED APPLICATION

This application claims priority to Korean Patent Application No. 10-2019-0129424, filed on Oct. 17, 2019, the entire contents of which are incorporated herein by reference.

FIELD

The present disclosure relates to a method and system of controlling an interior sound of a vehicle.

BACKGROUND

The statements in this section merely provide background information related to the present disclosure and may not constitute prior art.

Recently, the continuous development of new technology for domestic and overseas electric and hybrid vehicles are under way. Accordingly, since the driver does not recognize the driving feeling while driving the vehicle, there is a problem that an accident may occur. Accordingly, electric and hybrid vehicles have a minimum noise standard when driving.

Moreover, besides electric and hybrid vehicles, even in a normal vehicle, an additional driving sound is generated, along with the engine sound and exhaust sound, to create a sporty driving feeling at a high speed.

In order to separately generate the driving sound, the engine speed, engine torque, vehicle speed, and position of the accelerator pedal are analyzed and the driving sound in the interior of the vehicle is generated through a vibration generator according to a driving state of the vehicle.

Such a vibration generator is provided with an amplifier to increase the power of a signal. However, we have discovered that a phenomenon occurs wherein the electric current is distorted in a specific region due to the characteristics of the amplifier.

In other words, when the driving sound is generated, a digital signal is generated according to a given situation by an algorithm according to the driving state, and a process is performed such that the digital signal is converted into an analog signal, and the output signal of the analog signal is amplified according to the actual current. We have found that when the vehicle enters a high RPM region, a phenomenon of distortion occurs due to excessive use of the amplifier current, and a harmonic component is generated, thereby causing unnecessary noise in the vibration generator and the frame of the vehicle.

The foregoing is intended merely to aid in the understanding of the background of the present disclosure, and is not intended to mean that the present disclosure falls within the purview of the related art that is already known to those skilled in the art.

SUMMARY

The present disclosure provides a method and system for controlling an interior sound of a vehicle. In particular, the method and system are configured to reduce or minimize a phenomenon of distortion that may occur due to excessive use of an amplifier current when an additional sound is generated, thereby inhibiting or preventing a vibration generator and a frame of the vehicle from generating unnecessary noise.

In one form of the present disclosure, a method of controlling an interior sound of a vehicle, the method being configured to transmit an additional sound corresponding to an engine sound and an exhaust sound of the vehicle to the interior of the vehicle, includes: analyzing, by a controller, a plurality of orders having different frequencies based on an engine operating state; applying, by the controller, a pre-stored correction phase signal to orders of the plurality of orders; and synthesizing, by the controller, the orders applied with the pre-stored correction phase signal to output a drive signal for generating the additional sound.

In one form, applying the pre-stored correction phase signal may include: grouping, among the plurality of orders, orders based on whether a period of a signal waveform according to a frequency coincides with the order; and applying pre-stored correction phase signals to respective groups of the orders.

In another form, applying the pre-stored correction phase may include: grouping the orders in which maximum common divisors of the frequencies corresponding to the orders are coincided with each other.

In other form, synthesizing the orders may include synthesizing the orders for each group to which the pre-stored correction phase signal is applied.

Phases of the pre-stored correction phase signals may be set by each group such that a maximum current amplitude and a minimum current amplitude of a frequency band based on the orders by each group are less than or equal to a preset current value.

The pre-stored correction phase signal may derive the maximum current amplitude and the minimum current amplitude by deriving a value at which a derivative coefficient becomes zero in the frequency band according to some orders among the plurality of orders, and may derive the maximum current amplitude and the minimum current amplitude as a phase value that is less than or equal to the preset current value.

In one form, in synthesizing the orders, a predetermined gain value is applied to output a drive signal for the additional sound after synthesizing the orders for each group.

In one aspect of the present disclosure, a system for controlling interior sound of a vehicle, the system being configured to transmit an additional sound corresponding to an engine sound and an exhaust sound of the vehicle to the interior of the vehicle, may include: a sound module configured to transmit the additional sound based on an engine operating state; and a controller configured to control the additional sound of the sound module. In particular, the controller analyzes a plurality of orders with different frequencies based on the engine operating state, applies a pre-stored correction phase signal to orders among the plurality of orders, and synthesizes the orders of the plurality of orders to which the pre-stored correction phase signals are applied so as to output a drive signal for generating the additional sound, thereby allowing the sound module to transmit the additional sound as the drive signal.

The controller may group, among the plurality of orders, orders based on the frequencies, and may apply the pre-stored correction phase signals to respective groups of the orders.

The controller may group the orders in which the periods are coincident according to the frequencies, and may divide the signal periods into a plurality of groups.

The controller may synthesize the orders for each group to which the pre-stored correction phase signal is applied.

The pre-stored correction phase signal may be a phase set by each group so that a maximum current amplitude and a minimum current amplitude of a frequency band is less than or equal to a preset current value when synthesizing the orders for each group.

The controller, after synthesizing the orders for each group, may apply a predetermined gain value to output the drive signal for the additional sound.

In the method and system of controlling the interior sound of the vehicle with a structure as described above, the method and system may phase-change the frequency of an additional sound according to an engine operating state to increase current density, thereby inhibiting or preventing signal distortion due to the increase in the current density. As a result, the present disclosure may efficiently suppress occurrence of the distortion phenomenon caused by excessive use of the amplifier current when generating the additional sound, thus preventing unnecessary noise from occurring in the vibration generator and the frame of the vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
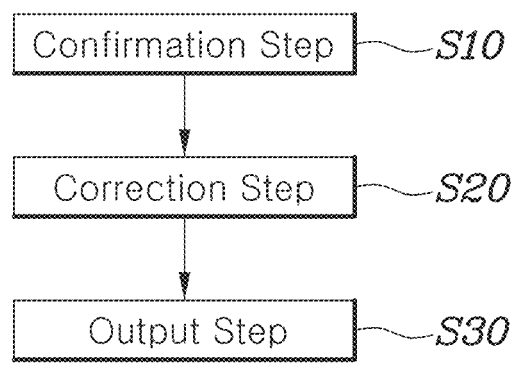
FIGS. 1 and 2 are flowcharts illustrating a method of controlling interior sound of a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, with reference to the accompanying drawings, according to an exemplary form of the present disclosure, the method and system for controlling interior sound of a vehicle is described.

Figure 2:
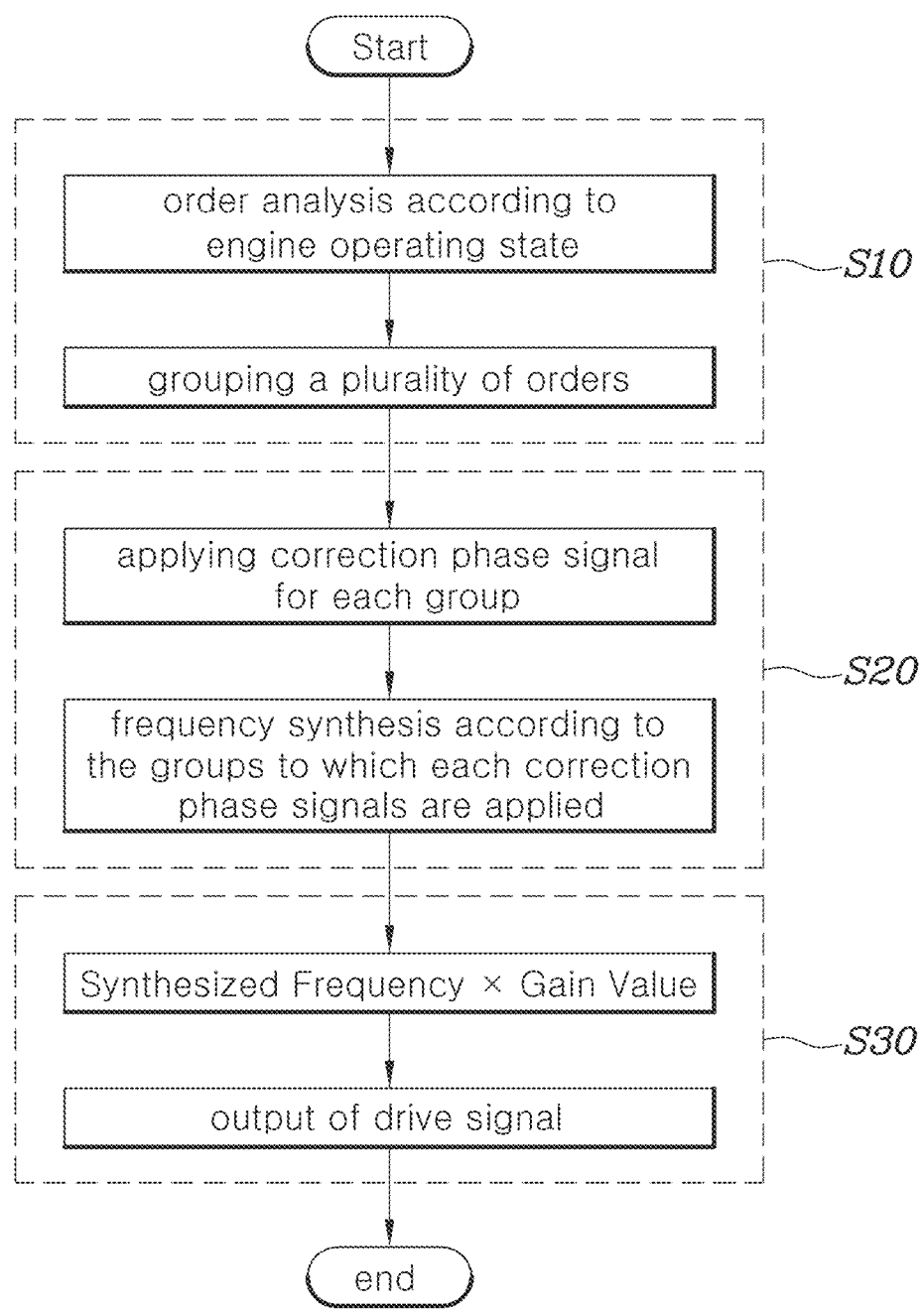
Figure 5:
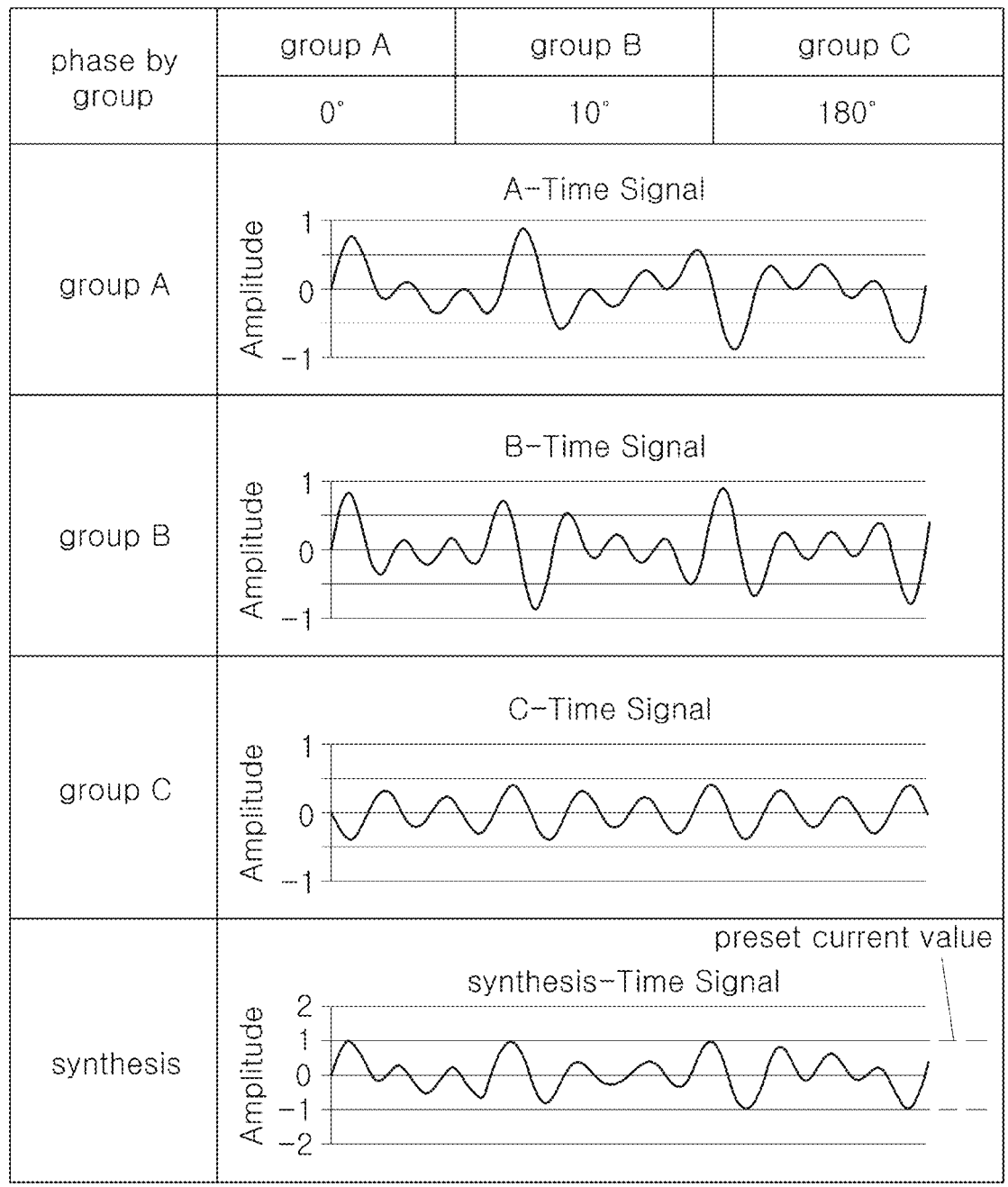
Figure 6:
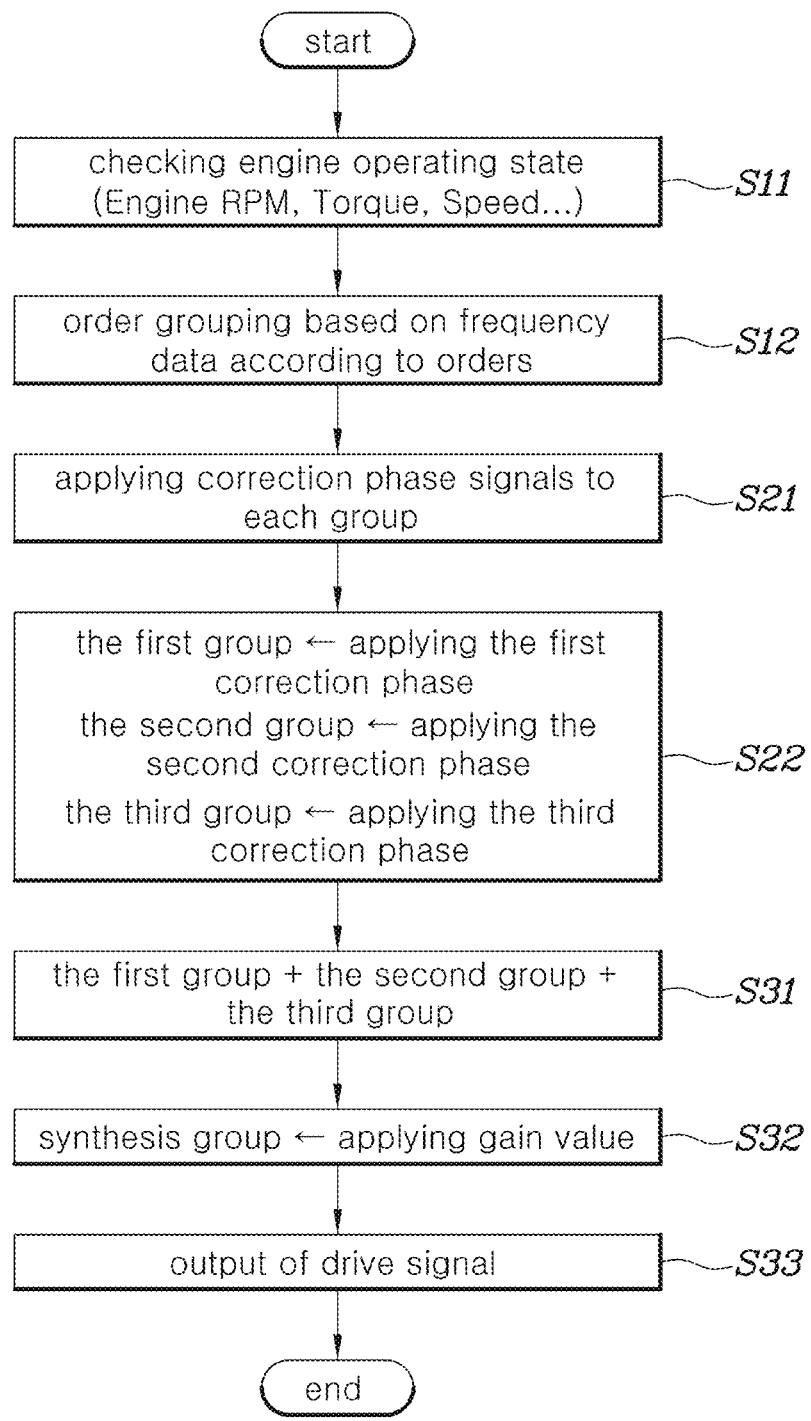
FIG. 6 is a flowchart illustrating a method of controlling interior sound of the vehicle in FIG. 1.
Figure 7:
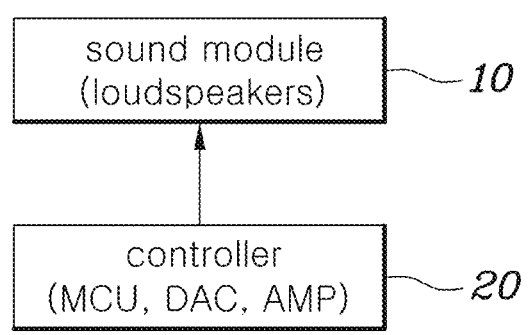
FIG. 7 is a schematic diagram of a system of controlling an interior sound of the vehicle.

FIGS. 1 and 2 are flowcharts illustrating a method of controlling interior sound of a vehicle according to one form of the present disclosure, and FIGS. 3 to 6 are views for explaining the method of controlling interior sound of the vehicle shown in FIG. 1, and FIG. 7 is a schematic diagram of a system of controlling an interior sound of the vehicle according to one form of the present disclosure.

Figure 3:
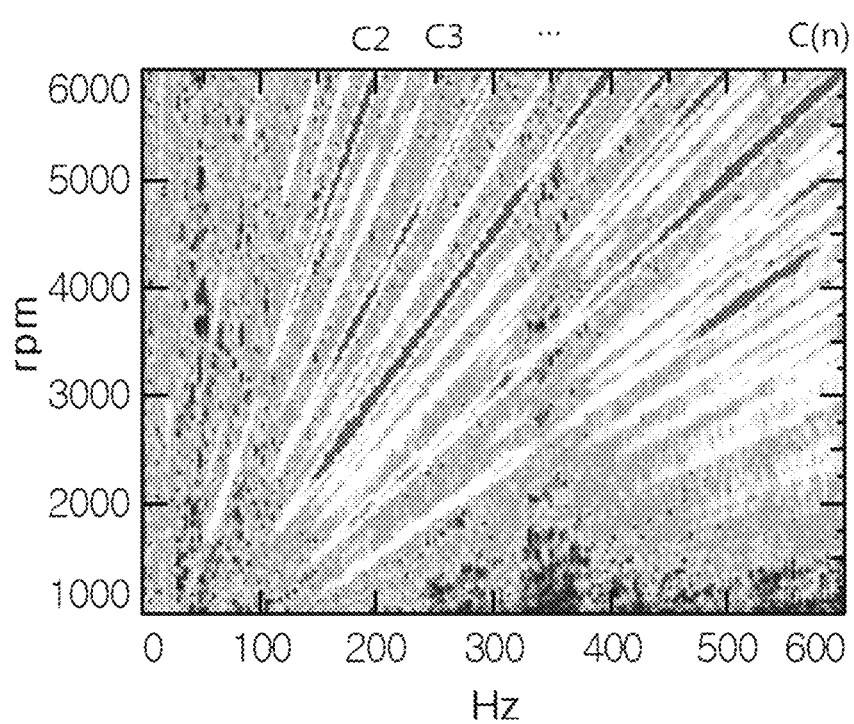
FIG. 3 is a view illustrating frequencies according to an engine speed.

As shown in FIGS. 1 to 3, the method of controlling the interior sound for the vehicle includes: a confirmation step S10 of analyzing a plurality of orders of magnitude having different frequencies obtained according to an engine operating state; a correction step S20 of applying a pre-stored correction phase signal to one or more orders out of the plurality of orders; and an output step S30 of synthesizing the plurality of orders to which the correction phase signal is applied and outputting the orders as a drive signal for generating additional sound.

In one form, in order to generate the additional sound corresponding to the engine sound and the exhaust sound in the interior of the vehicle, a loudspeaker may be provided, which emits sound similar to the engine sound or the exhaust sound by an electrical signal according to the operating state of the engine.

The present disclosure is to reduce or minimize the phenomenon that the current is distorted by characteristics of the amplifier that generates the electrical signal to the loudspeaker that generates the additional sound. To this end, a micro controller unit (MCU) receives a controller area network (CAN) signal according to the engine operating state and generates a sound waveform according to the situation by a preset algorithm, and a digital analogue converter (DAC) converts a digital signal according to the sound waveform into an analog signal, and the analog signal is amplified for actual current by an amplifier (AMP). Here, a current distortion phenomenon occurs due to the amplifier's own characteristics, and the present disclosure reduces a harmonic component caused by the distortion phenomenon to solve the problems of generating rattle noise.

In detail, the confirmation step S10 is performed, in which a plurality of orders are analyzed, which have different frequencies according to an engine operating state. Here, the engine operating state may be an engine speed (RPM) and an engine load, and this step analyzes a change of an engine frequency according to the engine speed. Also, the order is a frequency component that generates vibration exciting force based on the engine speed. For example, as shown in FIG. 3, orders C2, C3 . . . C (n) are set according to engine frequencies depending on the engine speed, and different frequencies are analyzed for each order. That is, in the confirmation step S10, the order according to the engine speed is stored in advance, and the frequency is analyzed for each order. The order may be set according to the characteristics of the speaker and the amplifier as well as the specification of the engine, and the frequency according to the order may be derived and stored in advance.

In this way, when a plurality of orders are analyzed through the confirmation step S10, a correction step S20 is performed, in which a correction phase signal is applied, which is pre-stored for one or more orders. That is, the current may be reduced in the frequency band by applying a pre-stored correction phase signal to frequencies according to the plurality of orders.

Here, in the correction step S20, the plurality of orders may be grouped into orders in which periods of synthesized signals according to the frequencies coincide with the orders, and by each group, the pre-stored correction phase signals may be applied. Subsequently, the output step S30 may synthesize the order by each group to which the correction phase signal is applied through the correction step S20.

For this reason, each of the correction phase signal may be applied to the plurality of orders, but a storage space is greatly required when storing all the correction phase signals corresponding to the respective orders. Therefore, it is desirable that the orders are grouped so that the period of the synthesized signal according to frequency coincides with the plurality of orders, and the correction phase signal is applied to each group.

In the above-described correction step S20, the signal periods of the respective groups may be coincident, and thus, may be divided into the plurality of groups. In this way, it is possible to derive an optimization value by the application and synthesis of the correction phase signals just in the case where the orders is coincident with the periods according to the frequencies, when grouping the orders. Accordingly, when grouping the orders, the periods are to be coincident.

Thus, when the plurality of orders are grouped so that the periods of the synthesized signals according to the frequencies coincide and the correction phase signals are applied to each group, the frequency shape by each group remains the same, and the amplitudes of the maximum current and the minimum current of the frequency band at the time of the synthesis may be adjusted. In this way, in the present disclosure, it is possible to prevent the distortion phenomenon caused by excessive current of the amplifier by adjusting the current amplitude of the frequency.

Meanwhile, in the correction phase signal, a phase may be set by each group so that the maximum current amplitude and the minimum current amplitude of the frequency band is less than or equal to the preset current value when combining the orders by each group. Here, the preset current value is to prevent the distortion phenomenon of the current to avoid the generation of the rattle noise, and the preset current value may be determined through experiments in advance.

In detail, the correction phase signal for the frequency obtained according to the order is to find a position where a derivative coefficient (slope) becomes zero at a frequency (sine waveform graph) obtained according to each order to derive the maximum current amplitude and the minimum current amplitude. At this time, when deriving the correction phase signal, by deriving a value wherein the derivative coefficient is 0 in the frequency band according to some of the plurality of orders, without checking the frequencies for every order, only a fraction may be used to derive the maximum current amplitude and minimum current amplitude that may be groupable respectively.

In other words, a derivative of $f(t)=A \sin(2\pi f_1 t)+B \sin(2\pi f_2 t)+C \sin(2\pi f_3 t)$ assuming three orders yields a value of $f'(t)=A(2\pi f_1)\cos(2\pi f_1 t)+B(2\pi f_2)\cos(2\pi f_2 t)+C(2\pi f_3)\sin(2\pi f_3 t)$, thereby deriving a value of $f'(t)=0$. Where A is the maximum amplitude, f is the frequency, and t is the time.

Through this, it is possible to derive the maximum current amplitude and the minimum current amplitude by using some values over time without checking all frequencies, and in this calculation, some values may be utilized over time within a period.

Using this calculation, the correction phase signal may be derived through the following equation.

$$f(t) = A\sin\left(2\pi f_1 t + \frac{\text{phase1}}{360} \times 2\pi\right) + B\sin\left(2\pi f_2 t + \frac{\text{phase2}}{360} \times 2\pi\right) + C\sin\left(2\pi f_3 t + \frac{\text{phase3}}{360} \times 2\pi\right)$$

This equation may be differentiated as follows.

$$f'(t) = A(2\pi f_1)\cos\left(2\pi f_2 t + \frac{\text{phase1}}{360} \times 2\pi\right) + B(2\pi f_2)\cos\left(2\pi f_2 t + \frac{\text{phase2}}{360} \times 2\pi\right) + C(2\pi f_3)\cos\left(2\pi f_3 t + \frac{\text{phase3}}{360} \times 2\pi\right)$$

Here, the phase may be a phase signal, and a phase signal for correction may be obtained by deriving a phase that is included in the preset current value while f'(t) is 0.

Figure 4:
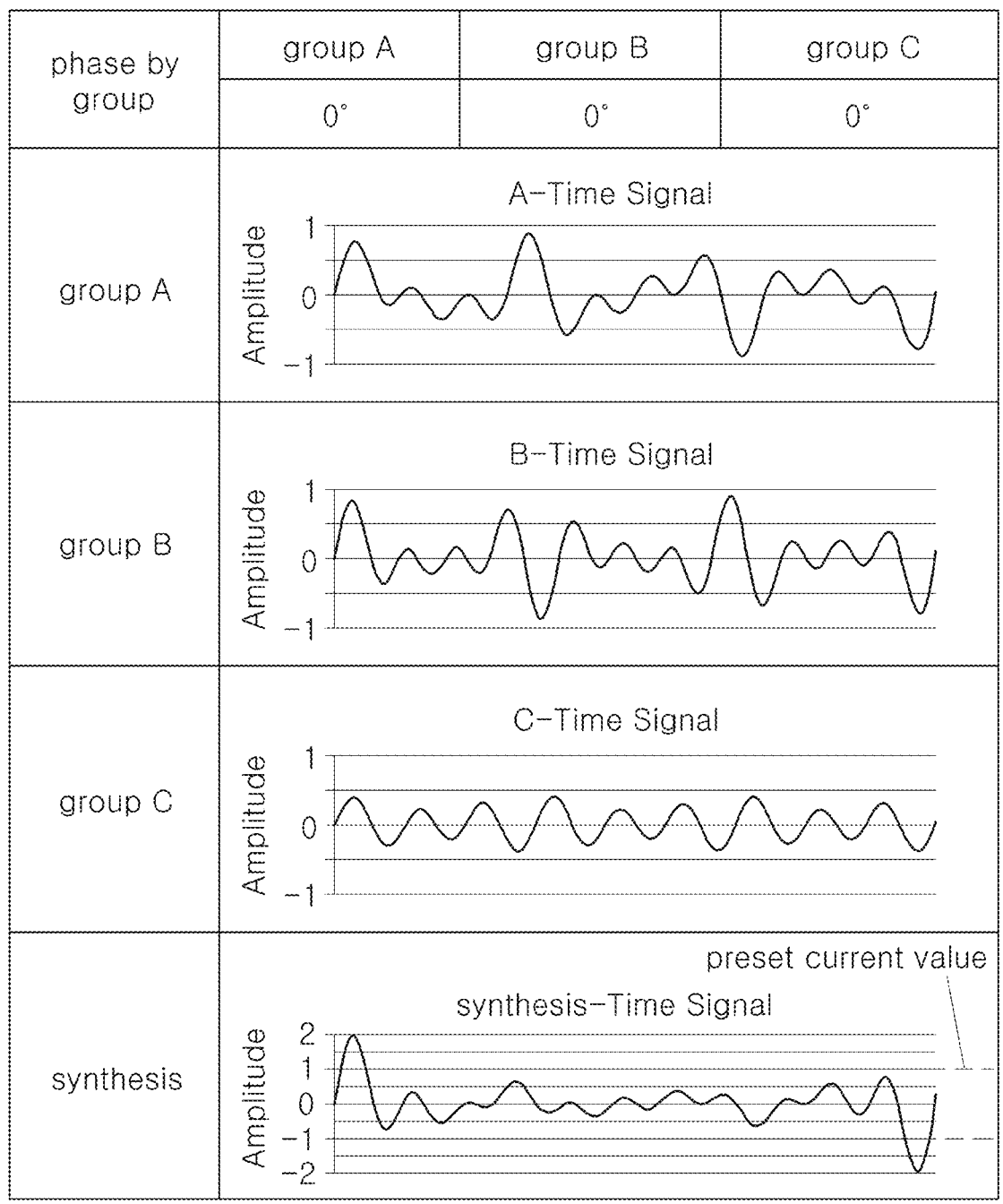
FIGS. 4 and 5 are graphs illustrating phases for explaining the method of controlling interior sound of the vehicle shown in FIG. 1.

That is, as shown in FIG. 4, when there are groups A, B, and C that do not coincide in periods, it may be seen that the current of the waveform in which each group is synthesized exceeds the current of 1A, which is an appropriate value of the amplifier characteristics, to reach the current of 2A. Meanwhile, as shown in FIG. 5, when applying the correction phase signal corresponding to the group B and C, the present disclosure may show that the current of the waveform synthesizing respective groups is 1A or less. In this way, when the correction phase signal is applied to each group, the current density per hour is increased, thereby reducing or minimizing the distortion of the current according to the characteristics of the amplifier by using this corresponding principle.

Referring to FIGS. 4 and 5, the frequency and correction phase signal based on each group are exemplary and may be applied to various values in consideration of various factors.

Meanwhile, after synthesizing the orders for each group, the output step S30 may apply a predetermined gain value to output the drive signal for the additional sound. This step is to output the drive signal of the loudspeaker for the additional sound output, and after synthesizing the orders of each group, the amplifier output value may be derived by multiplying the gain value with the synthesized signals.

Here, the gain value is based on the driving conditions of the vehicle, and an application of the gain value aims to form an additional sound identical to the engine sound according to various driving conditions in consideration of RPM, engine torque, vehicle speed, and the like. Due to this reason, the additional sound suitable for the driving conditions of the vehicle may be output through the loudspeaker depending on the output value of the amplifier.

As shown in FIG. 6, in one form of the present disclosure as described above, the control method of the present disclosure is as follows.

In one form, the method performs a step S11 of collecting information according to the engine operating state. This step enables the MCU to receive engine operation state information such as engine speed (RPM) and engine load from various sensors as a CAN signal, and generates a sound waveform depending on a situation by a preset algorithm.

Thereafter, a digital signal may be converted into an analog signal through the DAC, and a grouping step S12 is performed on the basis of the frequency data obtained according to a plurality of orders. In this case, each group may group the orders in which periods of synthesized signals according to the frequency coincide with each other, and a step S21 of applying respective correction phase signals to each group is performed. In FIG. 3, it is assumed that there are three groups and correction phase signals corresponding to each group, and it may be seen that step S22 of applying each correction phase signal is performed for each group.

In this way, when the correction phase is applied to each group, step S31 of synthesizing respective groups to which the correction phase signals are applied is performed, and then step S32 of applying the gain value after synthesizing respective groups are performed. In this way, as the gain value is applied, the step S33 of outputting the drive signal for the additional sound is performed, so that the additional sound may be generated through the sound module as the final output drive signal.

Meanwhile, as shown in FIG. 7, in the system of controlling the interior sound of the vehicle for transmitting the additional sound corresponding to the engine sound and exhaust sound of the vehicle, the system of controlling the interior sound of the vehicle includes: a sound module 10 for transmitting additional sound according to the engine operating state; and a controller 20, wherein the controller is provided to control the additional sound of the sound module 10, and by analyzing multiple orders with different frequencies according to engine operating conditions, and by synthesizing a plurality of orders to which the pre-stored correction phase signal and the correction phase signal are applied for one or more of the orders among the plurality of the orders, a drive signal for generating additional sound is output, thereby allowing the sound module to transmit additional sound as the drive signal.

Here, the sound module 10 may be a loudspeaker that generates additional sound by generating vibration according to the engine operating state. The controller 20 may be provided with a MCU which receives a signal input according to an engine operating state and generates a sound waveform according to a situation by a preset algorithm, a DAC for converting a digital signal according to a sound waveform into an analog signal, and an amplifier that amplifies the analog signal to actual current. Also, the controller 20 is configured to perform control of the sound module 10.

In other words, since the controller 20 analyzes the orders according to the engine operating state, and performs the phase change to apply the pre-stored correction phase signal for each order, the waveform of the frequency is generated below a predefined current, thereby increasing the current density and avoiding the rattle noise problem.

Here, the controller 20 groups a plurality of orders in which the periods of the synthesized signals according to the frequencies coincide. At this time, the controller 20 may be divided into a plurality of groups so that the signal period of each group is coincident, and may apply the pre-stored correction phase signal for each group. Here, the frequency according to the plurality of orders and the grouping by the frequency may be performed by the controller 20, and may be derived in advance and stored in the controller 20. Thereafter, the controller 20 may synthesize the orders for each group to which the correction phase signals are applied.

Here, the phase signal preset by the controller 20 may be set by each group for the phase in which the maximum current amplitude and the minimum current amplitude of the frequency band is less than or equal to the preset current value when synthesizing the orders for each group.

In addition, the controller 20 may output the drive signal for the additional sound by applying a preset gain value after synthesizing the orders for each group.

Due to this reason, the additional sound suitable for the driving conditions of the vehicle may be output through the loudspeaker depending on the output value of the amplifier.

The controller 20 according to an exemplary form of the present disclosure may be implemented through a nonvolatile memory (not shown) configured to store data relating to an algorithm developed to control operation of various components of the vehicle or software instructions for reproducing the algorithm and a processor (not shown) configured to perform the operations described below using data stored in the memory. Here, the memory and the processor may be implemented as separate chips. In the alternative, the memory and the processor may be implemented as a single chip integrated with each other. The processor may take a configuration having one or more processors.

For controlling the interior sound of the vehicle having a structure as described above, the method and system may phase-change the frequency of additional sound according to an engine operating state to increase the current density, thereby preventing signal distortion from occurring by increasing the current density. As a result, the distortion phenomenon caused by excessive use of the amplifier current when generating the additional sound is reduced or minimized, and unnecessary noise is inhibited or prevented from occurring in the vibration generator and the frame of the vehicle.

As described above, the present disclosure has been described with reference to the particular exemplary forms. However, those skilled in the art will appreciate that various modifications, additions and substitutions are possible, without departing from the scope and spirit of the present disclosure.

What is claimed is:

1. A method of controlling an interior sound of a vehicle, the method being configured to transmit an additional sound corresponding to an engine sound and an exhaust sound of the vehicle to an interior of the vehicle, and the method comprising:

analyzing, by a controller, a plurality of orders having different frequencies based on an engine operating state, wherein the order is a frequency component that generates vibration exciting force based on an engine speed;

applying, by the controller, a pre-stored correction phase signal to the plurality of orders; and synthesizing, by the controller, the plurality of orders applied with the pre-stored correction phase signal to output a drive signal for generating the additional sound, wherein applying the pre-stored correction phase signal comprises:

grouping, by obtaining frequency data of the plurality of orders, the plurality of orders into at least one group based on whether a period of a signal waveform coincides with a period of at least one respective order among the plurality of orders; and applying the pre-stored correction phase signal to the at least one group including the at least one respective order, wherein synthesizing the plurality of orders comprises: synthesizing the at least one respective order for the at least one group to which the pre-stored correction phase signal is applied, wherein a phase of the pre-stored correction phase signal is set by the at least one group such that a maximum current amplitude and a minimum current amplitude of a frequency band based on the at least one respective order by the at least one group are less than or equal to a preset current value, and wherein the pre-stored correction phase signal derives the maximum current amplitude and the minimum current amplitude by deriving a value at which a derivative coefficient becomes zero in the frequency band according to at least one order among the plurality of orders, and derives the maximum current amplitude and the minimum current amplitude as a phase value that is less than or equal to the preset current value.

2. The method of claim 1, wherein applying the pre-stored correction phase signal comprises: grouping the plurality of orders in which maximum common divisors of the frequencies corresponding to the plurality of orders are coincided with each other.

3. The method of claim 1, wherein in synthesizing the plurality of orders, a predetermined gain value is applied to output the drive signal for the additional sound after synthesizing the at least one respective order for the at least one group.

4. A system for controlling an interior sound of a vehicle, the system being configured to transmit an additional sound corresponding to an engine sound and an exhaust sound of the vehicle to an interior of the vehicle, and the system comprising:
  a sound module configured to transmit the additional sound based on an engine operating state; and
  a controller configured to:
  control the additional sound of the sound module,
  analyze a plurality of orders with different frequencies based on the engine operating state, wherein the order is a frequency component that generates vibration exciting force based on an engine speed,
  apply a pre-stored correction phase signal to the plurality of orders, and
  synthesize the plurality of orders to which the pre-stored correction phase signals are applied so as to output a drive signal for generating the additional sound, thereby allowing the sound module to transmit the additional sound as the drive signal,
  wherein applying the pre-stored correction phase signal comprises:
  grouping, by obtaining frequency data of the plurality of orders, the plurality of orders into at least one group based on whether a period of a signal waveform coincides with a period of at least one respective order among the plurality of orders; and
  applying the pre-stored correction phase signal to the at least one group including the at least one respective order,
  wherein synthesizing the plurality of orders comprises: synthesizing the at least one respective order for the at least one group to which the pre-stored correction phase signal is applied,
  wherein a phase of the pre-stored correction phase signal is set by the at least one group such that a maximum current amplitude and a minimum current amplitude of a frequency band based on the at least one respective order by the at least one group are less than or equal to a preset current value, and
  wherein the pre-stored correction phase signal derives the maximum current amplitude and the minimum current amplitude by deriving a value at which a derivative coefficient becomes zero in the frequency band according to at least one order among the plurality of orders, and derives the maximum current amplitude and the minimum current amplitude as a phase value that is less than or equal to the preset current value.

5. The system of claim 4, wherein the controller is configured to:
  enable periods of signals for the at least one group including the at least one respective order to be coincident, and
  divide the periods of signals into a plurality of groups.

6. The system of claim 4, wherein after synthesizing the at least one respective order for the at least one group, the controller is configured to apply a predetermined gain value to output the drive signal for the additional sound.

* * * * *